United States Patent
Smith et al.

(10) Patent No.: US 7,177,053 B2
(45) Date of Patent: Feb. 13, 2007

(54) COLOR ADJUSTMENT METHOD

(75) Inventors: Dana Stephen Smith, Dana Point, CA (US); Jon Matthew Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 908 days.

(21) Appl. No.: 09/784,733

(22) Filed: Feb. 14, 2001

(65) Prior Publication Data

US 2002/0135787 A1 Sep. 26, 2002

(51) Int. Cl.
*H04N 1/407* (2006.01)
*H04N 1/409* (2006.01)
*G06K 15/00* (2006.01)
*G06K 5/00* (2006.01)

(52) U.S. Cl. .................... 358/3.26; 358/3.27; 358/518
(58) Field of Classification Search ............... 358/1.9, 358/3.26, 523, 518–521, 530, 3.27; 382/167
See application file for complete search history.

(56) References Cited

U.S. PATENT DOCUMENTS

| | | | |
|---|---|---|---|
| 4,546,379 A | 10/1985 | Sarofeen et al. | |
| 4,908,701 A | 3/1990 | Udagawa | |
| 4,929,978 A | 5/1990 | Kanamori et al. | |
| 4,958,221 A | 9/1990 | Tsuboi et al. | |
| 4,959,712 A | 9/1990 | Tsuzuki et al. | |
| 5,012,299 A | 4/1991 | Sawamura et al. | |
| 5,124,788 A | 6/1992 | Tsuboi et al. | |
| 5,138,367 A | 8/1992 | Okamoto | |
| 5,142,356 A | 8/1992 | Usami et al. | |
| 5,182,638 A | 1/1993 | Tsuboi et al. | |
| 5,224,421 A | 7/1993 | Doherty | |
| 5,241,333 A | 8/1993 | Rodriguez, Jr. et al. | |
| 5,289,295 A | 2/1994 | Yumiba et al. | |
| 5,384,601 A | 1/1995 | Yamashita et al. | |
| 5,438,651 A | 8/1995 | Suzuki et al. | |
| 5,608,548 A | 3/1997 | Sobol | |
| 5,666,293 A * | 9/1997 | Metz et al. | 709/220 |
| 5,729,674 A | 3/1998 | Rosewarne et al. | |
| 5,737,032 A * | 4/1998 | Stenzel et al. | 348/649 |
| 5,913,014 A * | 6/1999 | Gilman et al. | 358/1.9 |
| 5,937,232 A * | 8/1999 | Taguchi et al. | 399/81 |
| 5,973,802 A * | 10/1999 | Hirota et al. | 358/521 |
| 5,982,947 A | 11/1999 | Hayashi | |
| 5,986,642 A | 11/1999 | Ueda et al. | |
| 6,108,441 A | 8/2000 | Hiratsuka et al. | |

FOREIGN PATENT DOCUMENTS

JP 07-046345 2/1995

* cited by examiner

*Primary Examiner*—David Moore
*Assistant Examiner*—James A. Thompson
(74) *Attorney, Agent, or Firm*—Madson & Austin

(57) ABSTRACT

A method for adjusting colors in a color reproduction device. A user input is received indicating a color adjustment for a color original. This is then used to select a transform. The transform is applied to color values to produce adjusted color values. The adjusted color values are then used in further processing and eventually converted into the printer color space.

19 Claims, 3 Drawing Sheets

COLOR ADJUSTMENT METHOD

BACKGROUND

1. Field

This disclosure relates to adjustment of colors in color reproduction devices, more particularly to processing of user-designated color adjustments.

2. Background

Color reproduction devices take a colored original and convert it into image data that is then reproduced on another substrate. These devices may include stand-alone copiers and fax machines, and multi-function peripherals (MFP) that combine these functions into one device. The printing substrate is typically paper, but can include photographic paper, transparencies, etc.

Some of these devices allow the user to adjust the colors of the original through a front control panel. Similar to increasing or decreasing the lightness in a black and white original, the user may choose to boost or reduce colors. However, this may cause problems in the color image processing that occur after the original is scanned.

In a typical color reproduction device, the original image is scanned and converted to red-green-blue (RGB) data. This data is then converted to luminance/chrominance color space, referred to as LAB, LCC or opponent color space. In an 8-bit system with values between 0 and 255, neutral colors are typically represented with the value 128 on the two opponent color axes. After adjustment by the user, chromaticity values may exceed thresholds or trigger values established in unadjusted cases of the color image processes.

For example, many color reproduction devices perform background detection and suppression in which background colors may be removed. This is common when the original image resides on a colored piece of paper. The background color is removed to prevent rendering of the background in the printer, which wastes resources and takes a longer amount of time. This process often uses a threshold that allows near-neutral colors to be removed from the image. After the user adjusts the colors, the value shifts may cause the background to be rendered in the copy.

Another problem may occur if the user makes a large gain adjustment. The values of colors already near a maximum value become limit-clipped. This results in loss of chromatic gradations. Subsequent operations cannot restore these chromatic gradations after they have been clipped. These images are rendered as uniform or nearly uniform, degrading the quality of the resulting reproduction.

Therefore, it would seem useful to have a method of adjusting user-designated color inputs to avoid interfering with further color image processing.

SUMMARY

One aspect of the invention is a method for adjusting colors in a color reproduction device. A user input is received indicating a color adjustment for a color original. This is then used to select a transform. The transform is applied to color values to produce adjusted color values. The adjusted color values are then used in further processing and eventually converted into the printer color space. The effect of applying the transform allows the original image to be altered in accordance with the user's wishes without having adverse effects on further processing such as background removal.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
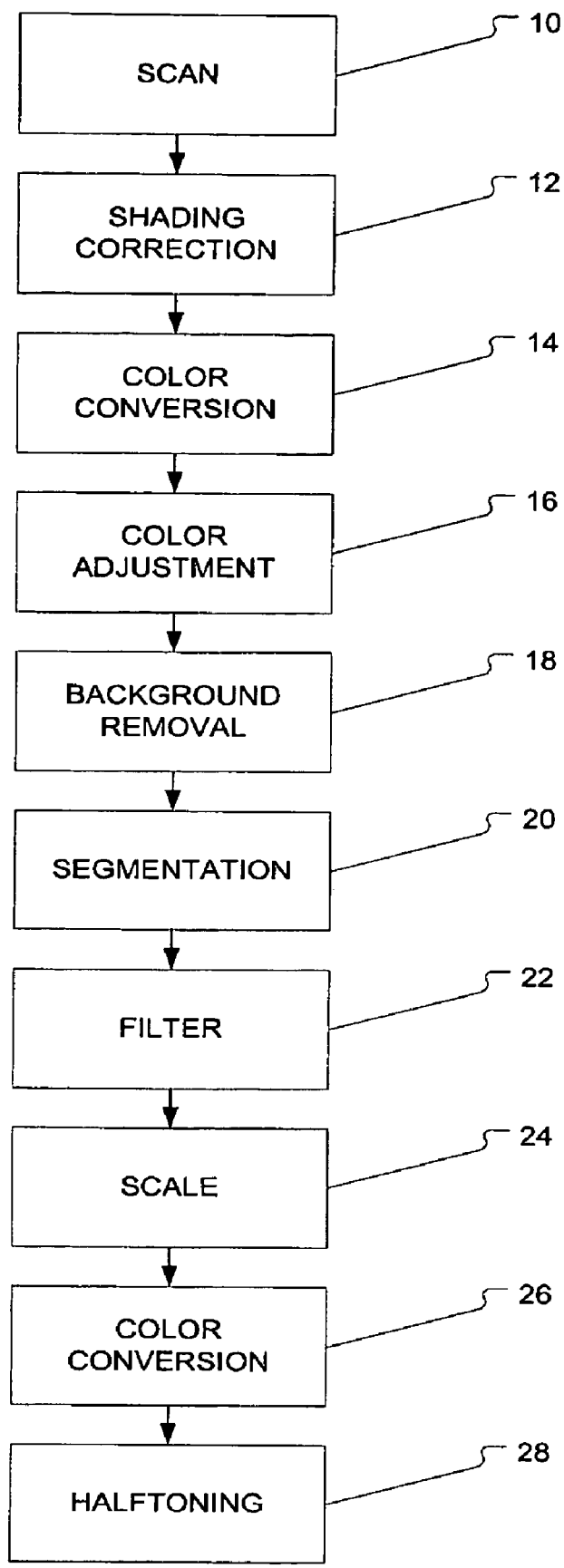
FIG. 1 shows a flowchart of one embodiment of a color image-processing pipeline, in accordance with the invention.

FIG. 1 shows one example of a color image-processing pipeline used in a typical color reproduction device, in accordance with the invention. The original is scanned at 10 and shading correction may be performed at 12 disturbances. The scan process converts the image of the original into RGB data. At 14, this RGB data is then converted to the opponent color space, sometimes referred to as either an LAB or LCC color space.

At 16, the process applies color adjustment to make any user-designated color modifications in such a manner as to prevent adverse effects further on in the pipeline. This process will be discussed in more detail with regard to FIG. 2. Without the color adjustment process, other operations, such as background removal 18 and segmentation 20 may be adversely affected. The process may apply enhancement filters 22 and perform any necessary scaling at 24.

Once whichever of the above processes, optional or not, are completed, the adjusted LCC data is converted into the printer color space, referred to as the printer space, at 26. In most cases, the printer space will be cyan-yellow-magenta-black (CMYK). In some instances it may be cyan-magenta-yellow (CMY). The printer space data is then halftoned at 28 and printed.

As mentioned above, the user may desire to make modifications of the colors in the original image. This would be received through a front control panel interface or some other form of user interface with the reproduction device. The user may be interfacing with a copier or printer across a network, having scanned the original at a workstation. The user interface in that instance may be a pop-up window on the user's workstation.

Figure 2:
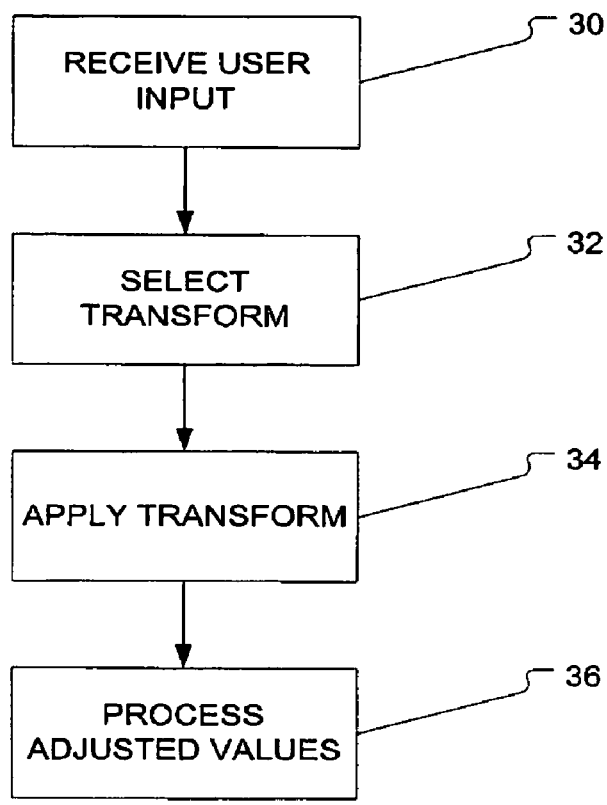
FIG. 2 shows a flowchart of one embodiment of a method for adjusting colors in a color reproduction device, in accordance with the invention.

One embodiment of the process of receiving and processing user modifications to the colors is shown in FIG. 2. The user input is received at 30. For ease of discussion, this step will most likely occur before the scanning step 10 in FIG. 2, but could occur anywhere in the process before the color space conversion performed at 14. However, in most cases, the user will adjust colors before pressing the 'Start' button on the copier, as an example.

The user input will more than likely translate into one of three options. The user could make an input to boost the colors, an input to reduce the colors, or make no input. For purposes of this discussion, no adjustment will be still considered a user input of no adjustment, even though the user will not actually make an input. Once the user input has been determined, the color adjustment process of 16 in FIG. 1 will use this input.

FIG. 2 shows the expansion of the color adjustment process 16 from FIG. 1. The user input will be used to select the appropriate transform at 32, as will be discussed with regards to FIGS. 3 and 4. The transform will be applied to the color values in 34, adjusting the color values in accordance with the user's wishes, but doing it in such a manner as to prevent adverse effects in downstream processing. The adjusted values are then used for the further processing at 36.

The transform used can be one of several types, including a difference exponential function, a difference polynomial function, a high order, second order or higher, polynomial, or a piecewise linear function. In addition, the color adjustment transform could be a table constructed by hand. Typically, the transform will be embodied in a lookup table (LUT), but the adjustment equations could be applied at run time.

Figure 3:
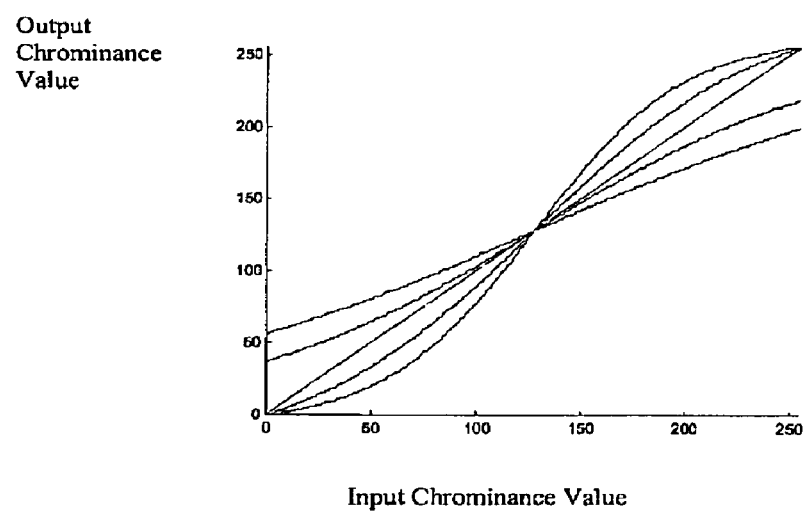
FIG. 3 shows a graph of color adjustment curves.

A graph of a first transform is shown in FIG. 3. The x-axis shows the input chrominance value, and the y-axis shows the output chrominance value, which is the adjusted color value used in further processing. The linear curve with the slope of one is the no adjustment case. The two sigmoidally-shaped curves with slopes greater than one are the curves used when the user indicates a color boost. When these curves are used, the adjusted color value will have greater chromatic magnitude than the input. Two levels of chroma reduction are also shown in the two curves having a slope less than 1. The adjusted values for these curves will be less than the chromatic magnitude of the input. Only five curves are shown here, but more or fewer curves could be used. These curves are intended only as examples and are not intended to limit the scope of the invention.

Application of this invention will typically cause a larger change through the mid-region of input data values. The change is non-uniformly applied and therefore will not preserve the metric properties of a perceptually uniform color space, such as LAB. A large boost of color values in the opponent space will produce a large change in perceived chroma. A linear curve that results in a large boost has the undesired consequence of producing large degrees of clipping. Therefore, it is desirable to apply a large change in color values at low original chroma and to reduce the amount of amplification at higher original chroma. A sigmoidally-shaped chroma amplification curve achieves the goal. This is of particular value for the case of limited user control options; that is, if a user control interface permits only a few boost or reduce color settings.

Figure 4:
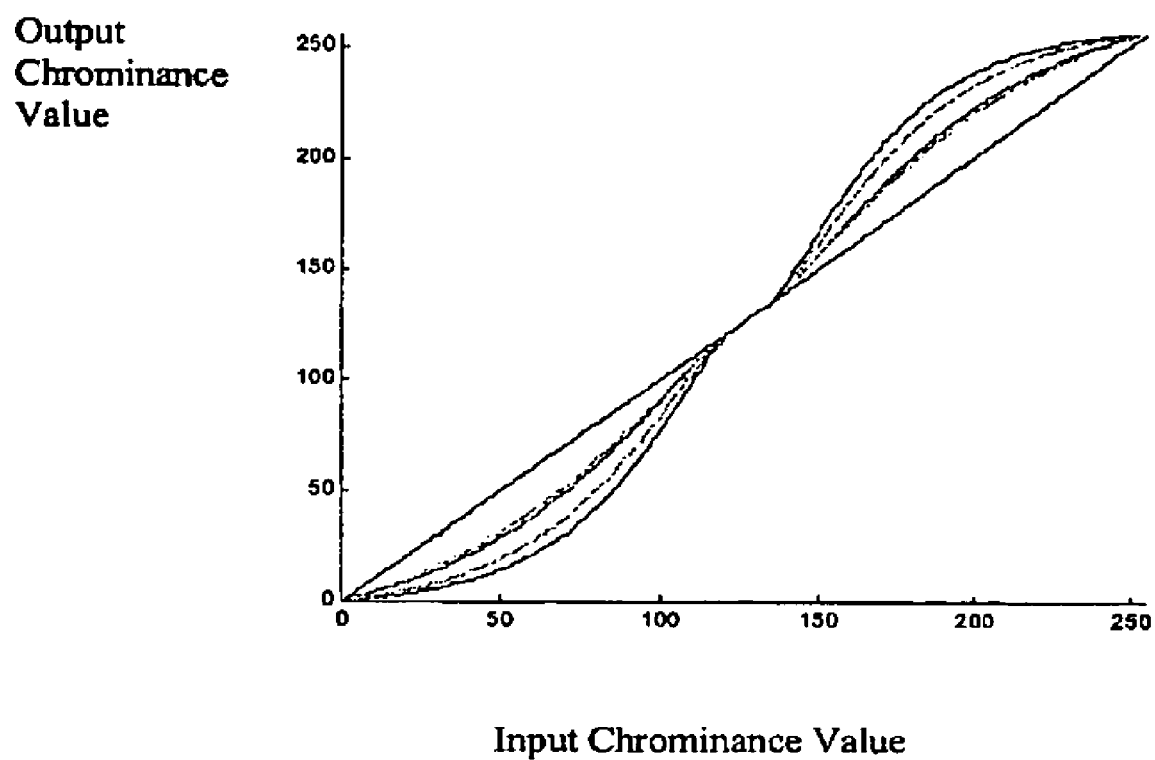
FIG. 4 shows a graph of alternative color adjustment curves.

In an alternate embodiment, for the boost case, an inflection point near the origin is introduced to postpone the changes in output value near neutrality and thus avoid amplification of background or stray color to a level that interferes with subsequent operations. FIG. 4 illustrates four levels of boost, which includes the inflection. The delay in data modification in moving away from the origin is apparent. Again, more or fewer levels of boost could be used, using four is only intended as an example.

It is similarly possible to add such an inflection region in the reduction curves shown in FIG. 3, although the side effects of concern in boosting colors are not a concern in color reduction. However, the non-linear reduction will lower the chromaticity of the highly saturated colors at a greater rate than less saturated data regions. This option may provide more adjustments to the user.

In the curves shown in FIGS. 3 and 4, a difference function of two exponential functions was used. The first exponential function, $F_A$, is the primary adjustment exponential function that forms the basis of the primary nonlinear value or LUT. The second exponential function, $F_B$, provides an offsetting retardation effect. This retardation effect can be balanced to maintain a unity relationship or allow a reduction effect near the origin. This could be utilized in removing small values of color to enhance the performance or robustness of subsequent color image processing.

The equations used in FIG. 4 are:

$$F_A = \frac{1}{1 + e^{-K_A * x - 128}}; \text{ for } x = 0 \text{ to } 255$$

$$F_B = \frac{1}{1 + e^{-K_B * x - 128}}; \text{ for } x = 0 \text{ to } 255$$

$$F_D = \left(\left(F_A - \frac{1}{2}\right) - \left(F_B - \frac{1}{2}\right) + \frac{1}{2}\right);$$

and the adjustment values are calculated as:

$$\text{value} = 255 * F_A + \left(255 * K\right) * \left(F_D - \frac{1}{2}\right).$$

$K_A$, $K_B$ and K are coefficients and a prefactor, respectively, that allow selection of the overall gain and onset retardation. For example, for one of the above curves, $K_A$ was 0.036, $K_B$ was 0.21 and K was 0. 14. $F_A$ is normalized to the range 0:1 by subtracting the minimum and dividing by the maximum. $F_B$ should also be normalized, with the typical $K_B$ coefficients already so ranged.

Typically, this process will be implemented in software, such as microcode in a digital signal processor (DSP). The implementation may also be in a central processing unit (CPU) or application specific integrated circuit (ASIC). In the case of the DSP or CPU, the methods of the invention could be distributed as a code file that is loaded into the processor. It is possible an ASIC may have a loaded file as well, although typically ASICs are just replaced with new ones. Additionally, this may be embodied in a printer driver, in the case of a user having a scanner at a workstation and printing to a printer. The printer driver may include embodiments of this invention to allow the user to adapt the reproduction of the scanned original. The code, or software, when executed, would result in the methods of the invention being applied.

In this manner, the color values are adjusted in accordance with the user wishes, but not in such a way as to cause problems in further processing. One such example was in the background removal process. By adjusting the colors using curves such as those shown in FIGS. 3 and 4, the colors can be boosted, reduced or left as is without concern of exceeding a threshold that will cause the print engine in the color reproduction device to waste resources. The waste would occur if the colors were boosted such that the background was no longer removed from the image, causing every pixel in the background to be processed instead of skipped as white space.

Thus, although there has been described to this point a particular embodiment for a method and apparatus for color adjustment in color reproduction devices, it is not intended that such specific references be considered as limitations upon the scope of this invention except in-so-far as set forth in the following claims.

What is claimed is:

1. A method for adjusting colors in a color reproduction device, the method comprising:

receiving a user input indicating a color adjustment for a color original, wherein the received user input is not a selection of a transform;

automatically selecting a transform based upon the user input to prevent clipping of the adjusted color values during subsequent processing, wherein the transform is selected from a plurality of sigmoidal-shaped curves, wherein the plurality of sigmoidal-shaped curves comprise curve lengths, wherein the plurality of sigmoidal-shaped curves share a common midpoint, and wherein the plurality of sigmoidal-shaped curves are not collinear for more than half of their curve lengths;

applying the transform to color values to produce adjusted color values; and processing the adjusted color values for conversion into printer space.

2. The method of claim 1, wherein the user input indicates a boost of color values.

3. The method of claim 1, wherein the user input indicates a reduction of color values.

4. The method of claim 1, wherein the user input indicates no adjustment of color values.

5. The method of claim 1, wherein the transform is one of the group comprising: a difference of exponential functions, a second order or higher high order polynomial, a piecewise linear function, and a difference polynomial function.

6. The method of claim 1, wherein applying the transform further comprises using the color values as indexes into a lookup table.

7. The method of claim 1, wherein applying the transform further comprises calculating the adjusted color values at run time.

8. A computer-readable medium including software code that, when executed, results in:

reception of a user input indicating a color adjustment for a color original, wherein the received user input is not a selection of a transform;

automatic selection of a transform based upon the user input to prevent adverse effects of the color adjustment on subsequent processing, wherein the transform is selected from a plurality of sigmoidal-shaped curves, wherein the plurality of sigmoidal-shaped curves intersect at a maximum of three points;

application of the transform to color values to produce adjusted color values; and processing of the adjusted color values for conversion into printer space.

9. The computer-readable medium of claim 8, wherein the computer-readable medium further comprises a downloadable file.

10. The computer-readable medium of claim 8, wherein the computer-readable medium further comprises a driver upgrade file.

11. A method for adjusting colors in a color reproduction device, the method comprising:

receiving a user input indicating a color boost for a color original, wherein the received user input is not a selection of a transform;

automatically selecting a transform based upon the user input to prevent adverse effects of the color adjustment on subsequent processing, wherein the transform comprises at least one sigmoidal-shaped curve, wherein available selection transforms have a length including a midpoint of the length, and wherein the available selection transforms share a common midpoint, and wherein the transform is a difference function of two exponential functions;

applying the selected transform to color values to produce adjusted color values;

calculating the adjusted color values at run time; and processing the adjusted color values for conversion into printer space.

12. The method of claim 11, wherein the user input indicates a boost of color values.

13. The method of claim 11, wherein the user input indicates a reduction of color values.

14. The method of claim 11, wherein the user input indicates no adjustment of color values.

15. The method of claim 11, wherein applying the transform further comprises using the color values as indexes into a lookup table.

16. The method of claim 11, wherein applying the transform further comprises calculating the adjusted color values at run time.

17. The method of claim 11, wherein the plurality of sigmoidal-shaped curves are not collinear for more than half of their curve lengths.

18. The method of claim 11, wherein the plurality of sigmoidal-shaped curves intersect at a maximum of three points.

19. The method of claim 11, wherein the adverse effects of the color adjustment that are prevented on subsequent processing include clipping of the adjusted color values.

* * * * *

UNITED STATES PATENT AND TRADEMARK OFFICE
CERTIFICATE OF CORRECTION

PATENT NO. : 7,177,053 B2  Page 1 of 1
APPLICATION NO. : 09/784733
DATED : February 13, 2007
INVENTOR(S) : Dana Stephen Smith et al.

It is certified that error appears in the above-identified patent and that said Letters Patent is hereby corrected as shown below:

In Column 2, lines 21-22, please replace "disturbances" with --to correct for scanning system image disturbances--.
In Column 3, line 19, please replace "no adjustment" with --'no adjustment'--.

Signed and Sealed this

Seventh Day of August, 2007

JON W. DUDAS
*Director of the United States Patent and Trademark Office*